US010981447B2

United States Patent
Kato

(10) Patent No.: US 10,981,447 B2
(45) Date of Patent: Apr. 20, 2021

(54) TRANSFER

(71) Applicant: UNIVANCE CORPORATION, Kosai (JP)

(72) Inventor: Tadahiko Kato, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 0 days.

(21) Appl. No.: 16/500,939

(22) PCT Filed: Apr. 7, 2017

(86) PCT No.: PCT/JP2017/014508
§ 371 (c)(1),
(2) Date: Oct. 4, 2019

(87) PCT Pub. No.: WO2018/185929
PCT Pub. Date: Oct. 11, 2018

(65) Prior Publication Data
US 2020/0070654 A1     Mar. 5, 2020

(51) Int. Cl.
*B60K 17/344*  (2006.01)
*F16H 37/06*  (2006.01)
(Continued)

(52) U.S. Cl.
CPC ......... *B60K 17/344* (2013.01); *F16H 37/065* (2013.01); *B60K 6/365* (2013.01);
(Continued)

(58) Field of Classification Search
CPC ...... B60K 17/344; B60K 6/365; B60K 23/08; B60K 2023/0858; F16H 37/065; F16H 37/06; F16D 2023/123
See application file for complete search history.

(56) References Cited

U.S. PATENT DOCUMENTS 4,270,409 A * 6/1981 Glaze ................... B60K 17/344
                                                              180/247
4,292,860 A * 10/1981 Kako ................... B60K 17/344
                                                              180/247
(Continued)

FOREIGN PATENT DOCUMENTS

JP         S58-128928 A    8/1983
JP         60-7450 U       1/1985
(Continued)

OTHER PUBLICATIONS

International Search Report dated Jun. 27, 2017 issued in counterpart International Application No. PCT/JP2017/014508 (2 pages).
(Continued)

*Primary Examiner* — Justin Holmes
(74) *Attorney, Agent, or Firm* — Westerman, Hattori, Daniels & Adrian, LLP

(57) ABSTRACT

To provide a transfer (10) capable of reducing its length in the axial direction.

The transfer (10) comprises: a first device (51) separably couples a first gear (21) to an input shaft (11) or a first output shaft (12) and a second device (52) separably couples a second gear (22) to the input shaft (11) or the first output shaft (12).

The first gear (21) and the second gear (22) are disposed axially between the first device (51) and the second device (52).

14 Claims, 10 Drawing Sheets

(51) Int. Cl.
   *B60K 6/365*   (2007.10)
   *B60K 23/08*   (2006.01)
   *F16D 23/12*   (2006.01)
(52) U.S. Cl.
   CPC ...... *B60K 23/08* (2013.01); *B60K 2023/0858* (2013.01); *F16D 2023/123* (2013.01)

(56) References Cited

U.S. PATENT DOCUMENTS

| | | | | |
|---|---|---|---|---|
| 4,559,846 A | * | 12/1985 | Cochran | B60K 17/344 180/247 |
| 5,411,450 A | * | 5/1995 | Gratton | B60K 17/344 477/124 |
| 2016/0363201 A1 | * | 12/2016 | McNally | F16H 57/043 |

FOREIGN PATENT DOCUMENTS

| | | |
|---|---|---|
| JP | 2006-232079 A | 9/2006 |
| JP | 2014-43161 A | 3/2014 |

OTHER PUBLICATIONS

Notification of Transmittal of Translation of the International Preliminary Report on Patentabililty (Form PCT/IB/338) issued in counterpart International Application No. PCT/JP2017/014508 dated Oct. 17, 2019 with Forms PCT/IB/373 and PCT/ISA/237. (6 pages).
Extended (Supplementary) European Search Report dated Dec. 7, 2020, issued in counterpart EP Application No. 17904563.8. (5 pages).

* cited by examiner

TRANSFER

TECHNICAL FIELD

The present invention relates to a transfer and more particularly, to an automotive transfer.

BACKGROUND ART

A transfer mounted in an automobile is a device that includes one input shaft and two output shafts and selectively transfers motive power from the input shaft to the two output shafts. In Patent Literature 1, a transfer is disclosed which includes an input shaft, a first output shaft, an intermediate shaft, a second output shaft, and a switching device. A first gear is amounted on the input shaft. A second gear is mounted on the first output shaft, which is disposed on the axis of the input shaft. A third gear and a fourth gear are disposed on the intermediate shaft so as to mesh with the first and second gears, respectively. A fifth gear is disposed on the second output shaft so as to mesh with the fourth gear. The switching device changes gear trains for transmitting motive power. The switching device sets the transfer in a two-wheel drive position, a four-wheel high-speed position, or a four-wheel low-speed position.

CITATION LIST

Patent Literature

Patent Literature 1: Japanese Utility Model Application Publication No. Sho 60(1985)-7450

SUMMARY OF INVENTION

Technical Problem

However, according to the above-mentioned conventional technology, the switching device is disposed between the first and third gears and the second and fourth gears. This increases the length of the shaft between the first and third gears and the second and fourth gears, and thus causes a problem in which the transfer lengthens in the axial direction.

The present invention has been made in view of the above circumstances. An object of the present invention is to provide a transfer capable of reducing its length in the axial direction.

Solution to Problem

To accomplish the above object, a transfer according the present invention includes an input shaft, a first output shaft, an intermediate shaft, and a second output shaft. The input shaft receives inputted torque. The first output shaft is disposed on the axis of the input shaft and rotatable relative to the input shaft. The intermediate shaft is disposed on an axis different from the axis of the input shaft. The second output shaft is disposed on an axis different from the axes of the intermediate shaft and input shaft. A first gear and a second gear are disposed on either one of the input shaft and first output shaft. A third gear and a fourth gear are disposed on the intermediate shaft so as to mesh with the first and second gears, respectively. A fifth gear is disposed on the second output shaft so as to mesh with the fourth gear. A switching device includes a first device and a second device. The first device separably couples the first gear to the input shaft or the first output shaft. The second device separably couples the second gear to the input shaft or the first output shaft. The first and second gears are disposed axially between the first and second devices.

Advantageous Effects of Invention

According to a first aspect of the transfer, the first device separably couples the first gear to the input shaft or the first output shaft, and the second device separably couples the second gear to the input shaft or the first output shaft. As the first and second gears are disposed axially between the first and second devices, it is possible to shorten the shaft between the first and third gears and the second and fourth gears. As a result, the axial length of the transfer can be reduced.

According to a second aspect of the transfer, the first device switches between a state where the input shaft and the first gear are coupled or the first output shaft and the second gear are coupled and a state where the input shaft and the first output shaft are coupled. Therefore, in addition to the advantageous effect provided by the first aspect 1, it is possible to achieve weight reduction by decreasing the number of parts and simplify the configuration of the switching device.

According to a third aspect of the transfer, when the switching device transmits torque from the input shaft to the second output shaft via the first gear, the third gear, the fourth gear, and the fifth gear, torque is transmitted from the input shaft to the first output shaft via the first gear, the third gear, the fourth gear, and the second gear. The first, third, and fourth gears are shared without installing additional gears. Therefore, in addition to the advantageous effects provided by the first or second aspect, it is possible to reduce the speed of both the first and second output shafts while suppressing an increase in the size of the device.

According to a fourth aspect of the transfer, when the switching device transmits torque from the input shaft to the first output shaft, torque is transmitted from the input shaft to the second output shaft via the second gear and the fourth gear. Therefore, in addition to the advantageous effects provided by any one of the first to third aspects, it is possible to transmit torque of the input shaft to the first and second output shafts.

According to a fifth aspect of the transfer, the switching device has a position where torque of the input shaft is not transmitted to the first gear and the first output shaft. Therefore, in addition to the advantageous effects provided by any one of the first to fourth aspects, it is possible to obtain a neutral position.

According to a sixth aspect of the transfer, the first device and the second device are driven in the axial direction due to the rotary motion of cams having the same central axis. Therefore, in addition to the advantageous effects provided by any one of the first to fifth aspects, it is possible to simplify the configuration of the switching device.

According to a seventh aspect of the transfer, a third device in the switching device separably couples the fourth gear to the intermediate shaft. The third device separably couples the second gear to the input shaft or the first output shaft. Therefore, in addition to the advantageous effects provided by any one of the first to sixth aspects, it is possible to separate the fourth gear from each shaft and obtain a neutral position.

According to a eighth aspect of the transfer, the first device, the second device, and the third device are driven in the axial direction due to the rotary motion of cams having the same central axis. Therefore, in addition to the advantageous effects provided by the seventh aspect, it is possible to simplify the configuration of the switching device.

According to a ninth aspect of the transfer, when a transition is made from a state where torque is transmitted from the input shaft to the first output shaft and transmitted from the second gear to the second output shaft via the fourth and fifth gears to a state where torque is transmitted from the input shaft to the first output shaft via the first, third, fourth, and second gears and transmitted to the second output shaft via the fourth and fifth gears, the cams cause the third device to engage the fourth gear with the intermediate shaft, and then switch the first device. Thus, the first output shaft and the gears can be prevented from rotating before the first device operates. Therefore, in addition to the advantageous effects provided by the eighth aspect, it is possible to suppress noise generation when the first device is switched.

According to a tenth aspect of the transfer, when a transition is made from a state where torque is transmitted from the input shaft to the first output shaft via the first, third, fourth, and second gears and transmitted to the second output shaft via the fourth and fifth gears to a state where torque is transmitted from the input shaft to the first output shaft and transmitted from the second gear to the second output shaft via the fourth and fifth gears, the cams cause the first device to engage the input shaft with the first output shaft, and then switch the third device. Thus, the intermediate shaft and the fourth gear can be prevented from rotating before the third device operates. Therefore, in addition to the advantageous effects provided by the ninth aspect, it is possible to suppress noise generation when the third device is switched.

DESCRIPTION OF EMBODIMENTS

Figure 1:
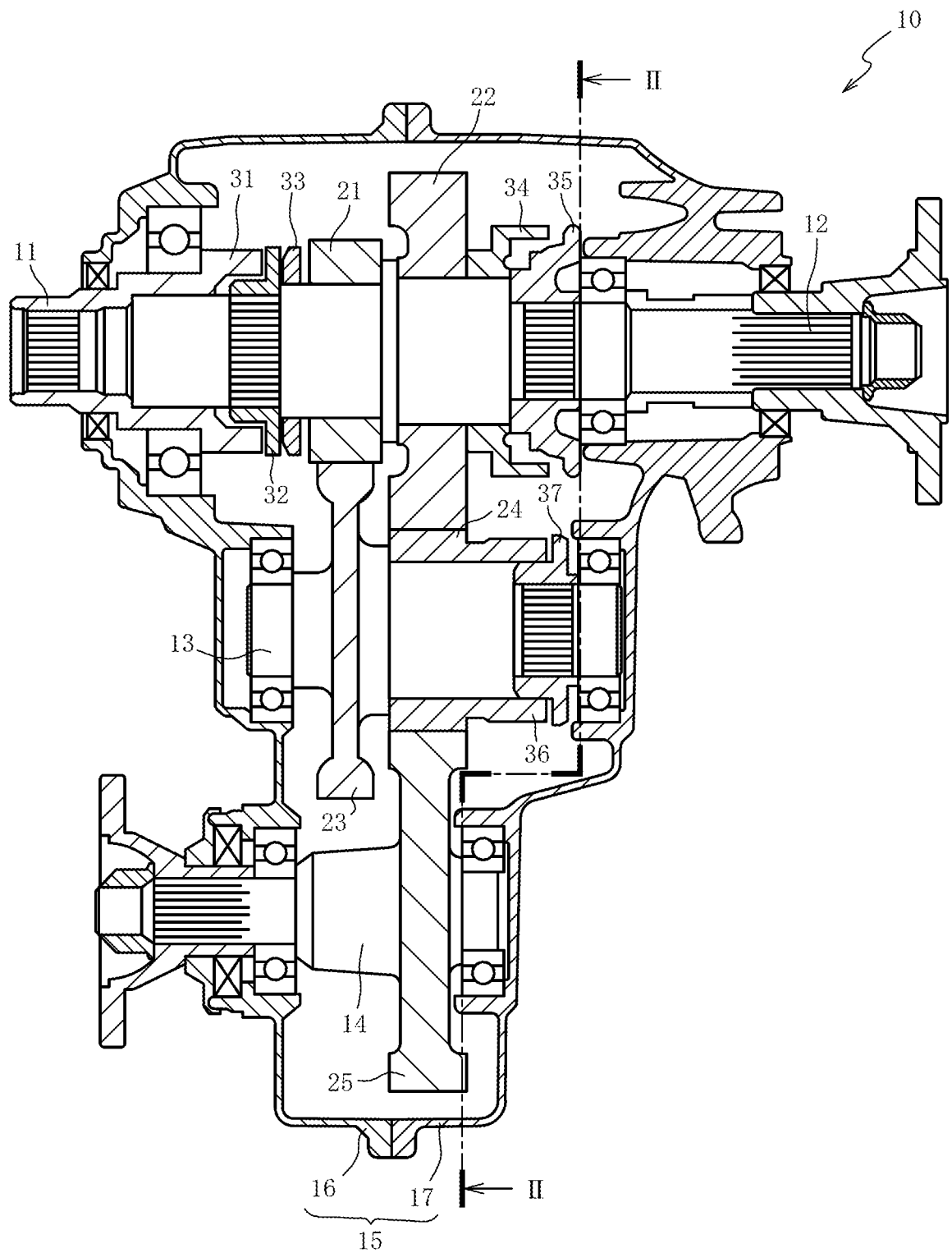
FIG. 1 is a cross-sectional view of a transfer according to a first embodiment of the present invention.

Preferred embodiments of the present invention will now be described with reference to the accompanying drawings. A first embodiment is described below with reference to FIGS. 1 to 7. FIG. 1 is a cross-sectional view including the axis of a transfer 10 according to the first embodiment of the present invention.

As illustrated in FIG. 1, the transfer 10 includes an input shaft 11, a first output shaft 12, an intermediate shaft 13, and a second output shaft 14. The input shaft 11 and the first output shaft 12 are disposed on the same axis. The intermediate shaft 13 is disposed on an axis different from the axis of the input shaft 11. The second output shaft 14 is disposed on an axis different from the axes of the intermediate shaft 13 and input shaft 11. The input shaft 11, the first output shaft 12, the intermediate shaft 13, and the second output shaft 14 are rotatably supported by a case 15.

The case 15 includes a first case 16 and a second case 17. The first case 16 accommodates the area of the input shaft 11. The second case 17 accommodates the area of the first output shaft 12. A space for gear accommodation is formed when the first case 16 and the second case 17 are butted against each other. The case 15 is filled with an adequate amount of lubricating oil (not depicted) such that the outer periphery (lower end) of a third gear 23 (described later) is constantly immersed in the lubricating oil.

The input shaft 11 is linked to an engine or other driving source (not depicted) via, for example, a transmission. An end of the first output shaft 12 is relatively rotatably supported by the inside of an end of the input shaft 11. The first output shaft 12 is linked, for example, to a rear wheel. A first gear 21 and a second gear 22 are relatively rotatably disposed on the first output shaft 12.

The intermediate shaft 13 is disposed in parallel with the input shaft 11 and the first output shaft 12. The third gear 23 and a fourth gear 24 are disposed on the intermediate shaft 13. The third gear 23 is in constant mesh with the first gear 21. The fourth gear 24 is in constant mesh with the second gear 22. The third gear 23 is coupled to the intermediate shaft 13. The fourth gear 24 is rotatably disposed on the intermediate shaft 13.

The second output shaft 14 is disposed in parallel with the input shaft 11, the first output shaft 12, and the intermediate shaft 13. The second output shaft 14 is linked, for example, to a front wheel. A fifth gear 25 in constant mesh with the fourth gear 24 is disposed on the second output shaft 14. The fifth gear 25 is coupled to the second output shaft 14.

A hub 31 is coupled to the input shaft 11. Splines 32, 33 are arranged in the axial direction of the hub 31. The spline 32 is coupled to the first output shaft 12, and the spline 33 is coupled to the first gear 21. A sleeve 54 (see FIG. 4) of a first device 51 (described later) is disposed on the outer peripheries of the hub 31 and splines 32, 33. When a shift fork (not depicted) moves, the sleeve 54 slides in the axial direction while meshing with the hub 31 and the splines 32, 33.

A spline 34 is coupled to the second gear 22. A spline 35 is lined up in the axial direction of the spline 34. The spline 35 is coupled to the first output shaft 12. A sleeve 56 (see FIG. 4) of a second device 52 (described later) is disposed on the outer peripheries of the splines 34, 35. When a shift fork 45 (described later) moves, the sleeve 56 slides in the axial direction while meshing with the splines 34, 35.

A spline 36 is coupled to the fourth gear 24. A spline 37 is lined up in the axial direction of the spline 36. The spline 37 is coupled to the intermediate shaft 13. A sleeve 55 of a third device 53 (described later) is disposed on the outer peripheries of the splines 36, 37. When a shift fork 42 (described later) moves, the sleeve 55 slides in the axial direction while meshing with the splines 36, 37.

Figure 2:
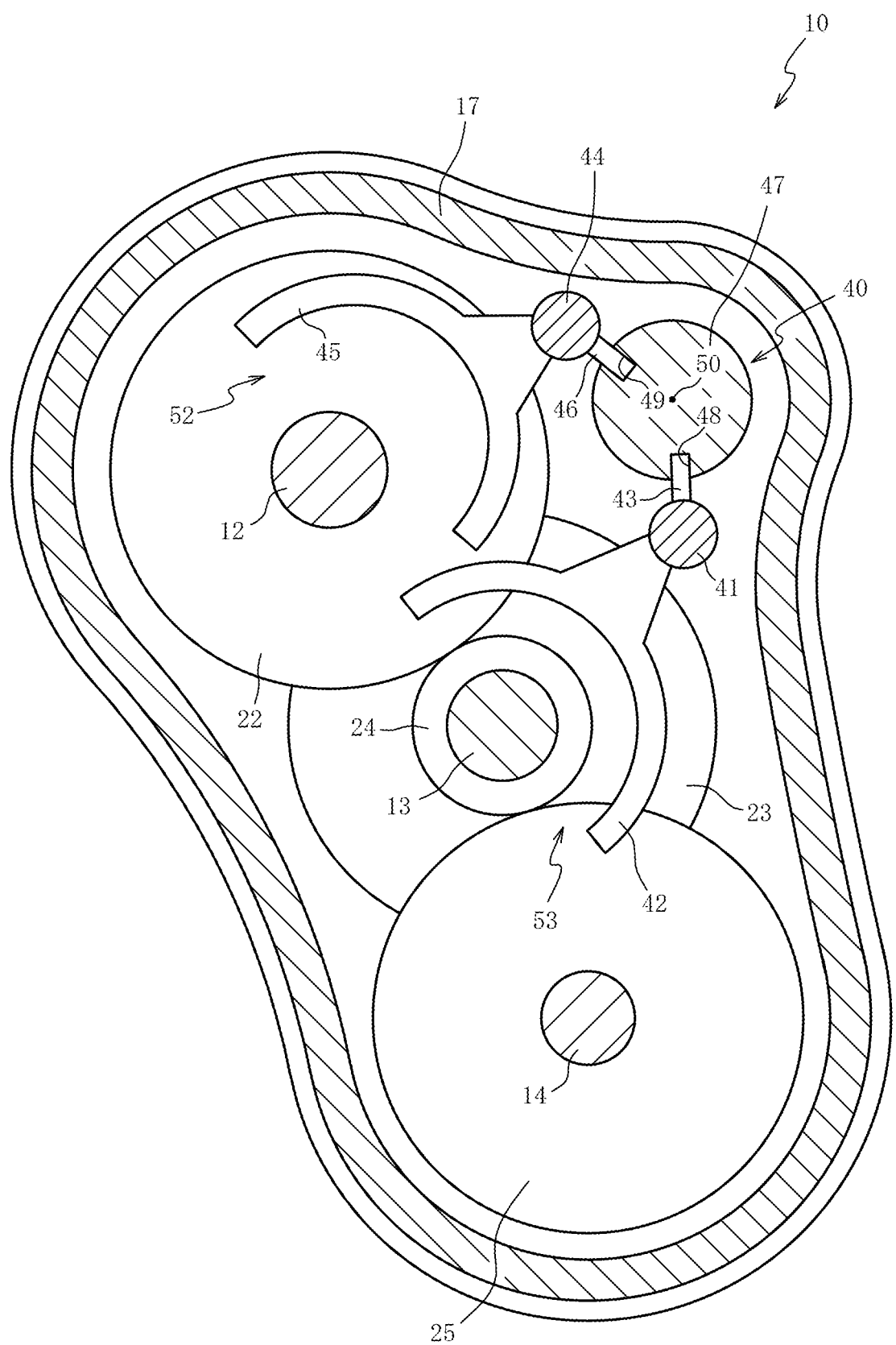
FIG. 2 is a cross-sectional view of the transfer taken along line II-II in FIG. 1.

FIG. 2 is a cross-sectional view of the transfer 10 taken along line II-II in FIG. 1. For ease of understanding, FIG. 2 does not depict the splines 34, 35, 36, 37, the sleeves 55, 56, and the tooth profiles of the second gear 22, third gear 23, and fifth gear 25.

As illustrated in FIG. 2, the transfer 10 includes a switching device 40 that changes gear trains for transmitting motive power. The switching device 40 includes the first device 51 (see FIG. 4), the second device 52, and the third device 53. The switching device 40 includes the first output shaft 12, fork shafts 41, 44, and a drum 47 (cylindrical cam). The fork shafts 41, 44 are disposed in parallel with the intermediate shaft 13 and the second output shaft 14. The drum 47 has cams 48, 49 that are formed in a groove on a peripheral cylindrical surface.

The fork shaft 41 slidably supports the shift fork 42 of the third device 53. A pin 43 is swingably coupled to the shift fork 42 and attached to the cam 48. The fork shaft 44 slidably supports the shift fork 45 of the second device 52. A pin 46 is swingably coupled to the shift fork 45 and attached to the cam 49.

The fork shaft 44 slidably supports the shift fork (existing behind the second gear 22 as viewed in FIG. 2) of the first device 51 (see FIG. 4) as well. A pin (not depicted) is swingably coupled to that shift fork and attached to a cam groove of the drum 47 (cylindrical cam).

A motor or other actuator (not depicted) causes the drum 47 to rotate around a central axis 50 parallel to the fork shafts 41, 44. When the drum 47 rotates, the pins 43, 46 are driven along a preset cam curve so that the shift forks 42, 45 move in the axial direction (in the vertical direction as viewed in FIG. 2). The sleeves 54, 55, 56 of the first device 51 (see FIG. 4), second device 52, and third device 53 engage with the shift forks. Therefore, when the shift forks 42, 45 move, the sleeves 54, 55, 56 sequentially move in the axial direction.

Figure 3:
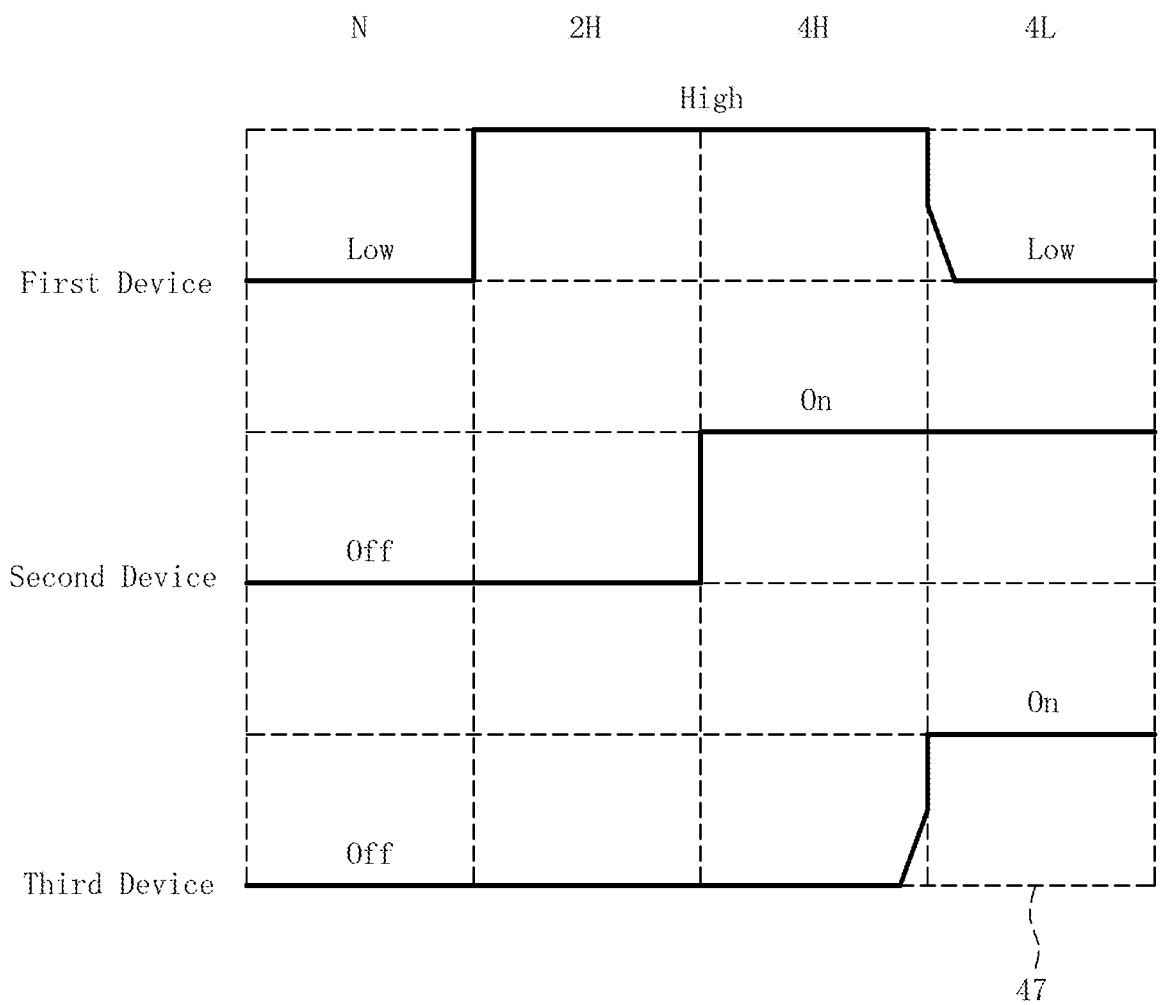
FIG. 3 is a diagram illustrating the relationship between a switching device and various positions of the transfer.

FIG. 3 is a diagram illustrating the relationship between the switching device 40 and various positions of the transfer 10. As illustrated in FIG. 3, the positions of the first device 51, second device 52, and third device 53 are switched along the cam curve of the drum 47. Accordingly, the transfer 10 selects a two-wheel drive position (2H), a neutral position (N), a four-wheel high-speed position (4H), or a four-wheel low-speed position (4L).

Figure 4:
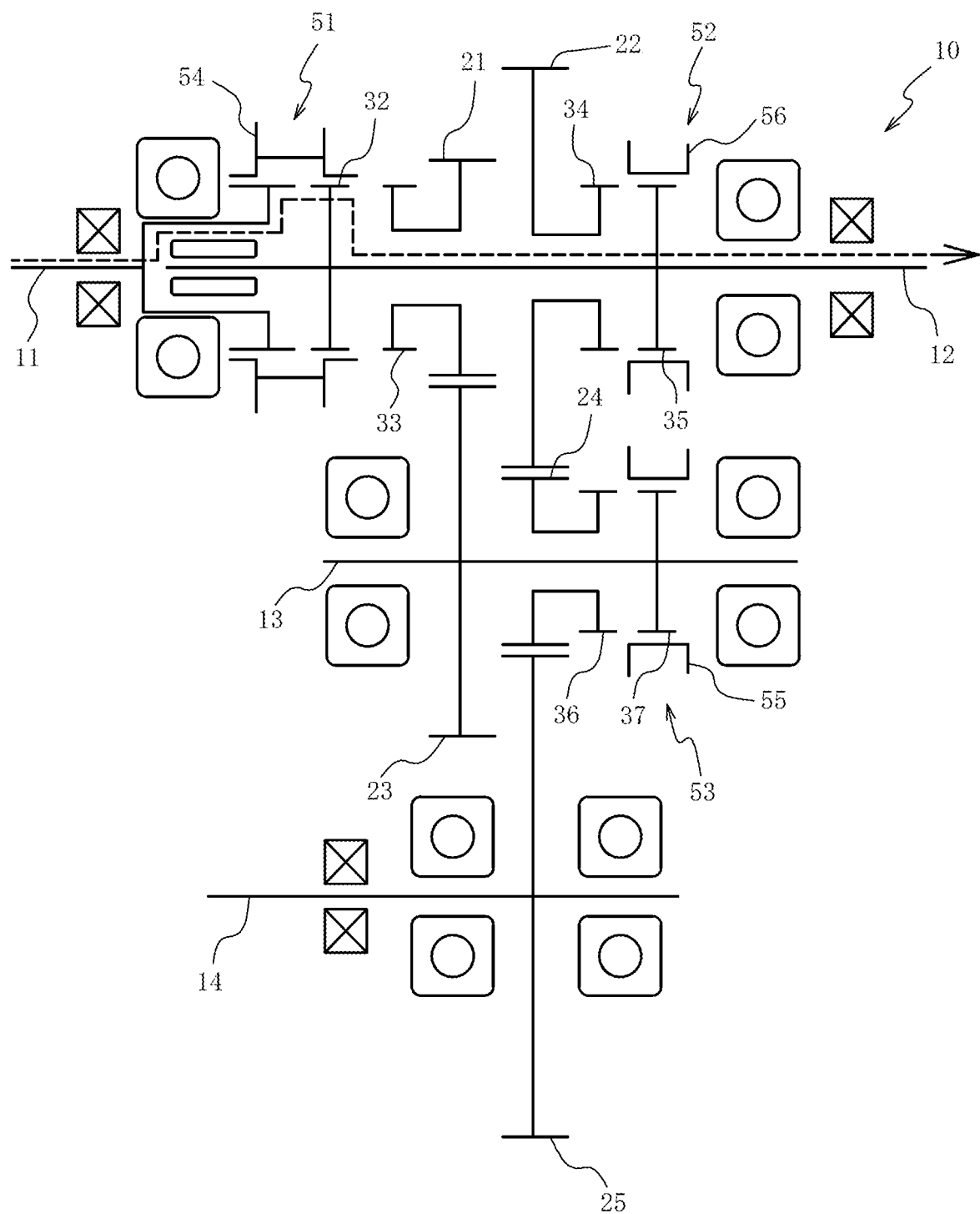
FIG. 4 is a skeleton diagram illustrating the transfer in a two-wheel drive position.

FIG. 4 is a skeleton diagram illustrating the transfer 10 in the two-wheel drive position (2H). A broken line in FIG. 4 represents a power transmission path (the same holds true for FIGS. 5 to 7). In the two-wheel drive position (2H), the first device 51 is switched to HIGH (a state where the input shaft 11 is connected to the first output shaft 12), and the second device 52 and the third device 53 are switched to OFF (see FIG. 3).

In this state, as illustrated in FIG. 4, the sleeve 54 of the first device 51 engages with the hub 31 and the spline 32, and the sleeve 55 of the third device 53 and the sleeve 56 of the second device 52 engage with only the splines 35, 37. Accordingly, torque of the input shaft 11 is transmitted to the first output shaft 12 via the sleeve 54. As the first to fifth gears 21-25 do not rotate, it is possible to reduce friction due to gear rotation.

Figure 5:
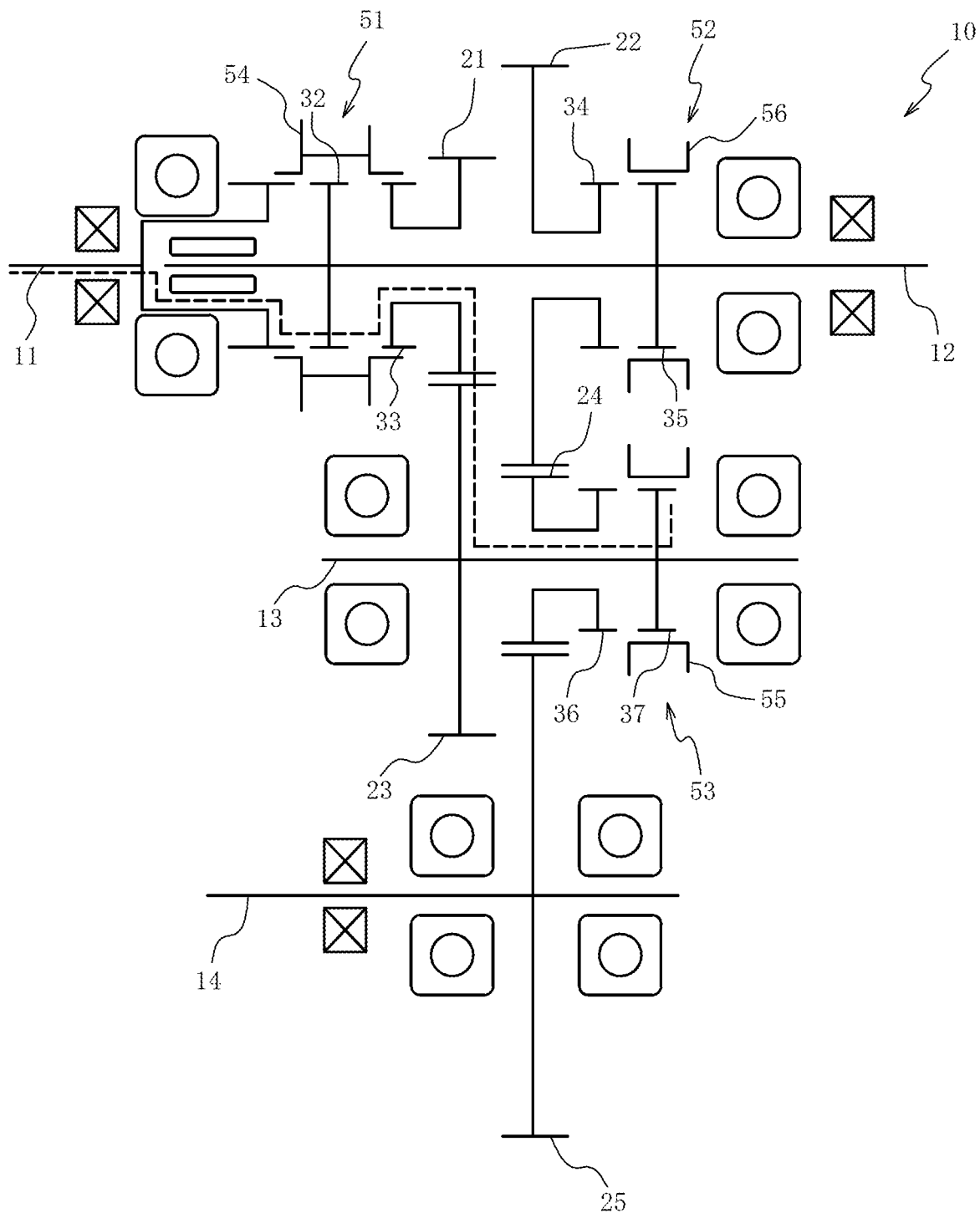
FIG. 5 is a skeleton diagram illustrating the transfer in a neutral position.

FIG. 5 is a skeleton diagram illustrating the transfer 10 in the neutral position (N). In the neutral position (N), the first device 51 is switched to Low (a state where the input shaft 11 is connected to the first gear 21), and the second device 52 and the third device 53 are switched to OFF (see FIG. 3).

In this state, as illustrated in FIG. 5, the sleeve 54 of the first device 51 engages with the hub 31 and the spline 33, and the sleeve 55 of the third device 53 and the sleeve 56 of the second device 52 engage with only the splines 35, 37. Accordingly, the torque of the input shaft 11 is transmitted to the first gear 21 via the sleeve 54. The first gear 21 idles on the first output shaft 12. The third gear 23 meshing with the first gear 21 rotates. However, the fourth gear 24 idles on the intermediate shaft 13. Therefore, no torque is transmitted to the first output shaft 12 and the second output shaft 14.

Figure 6:
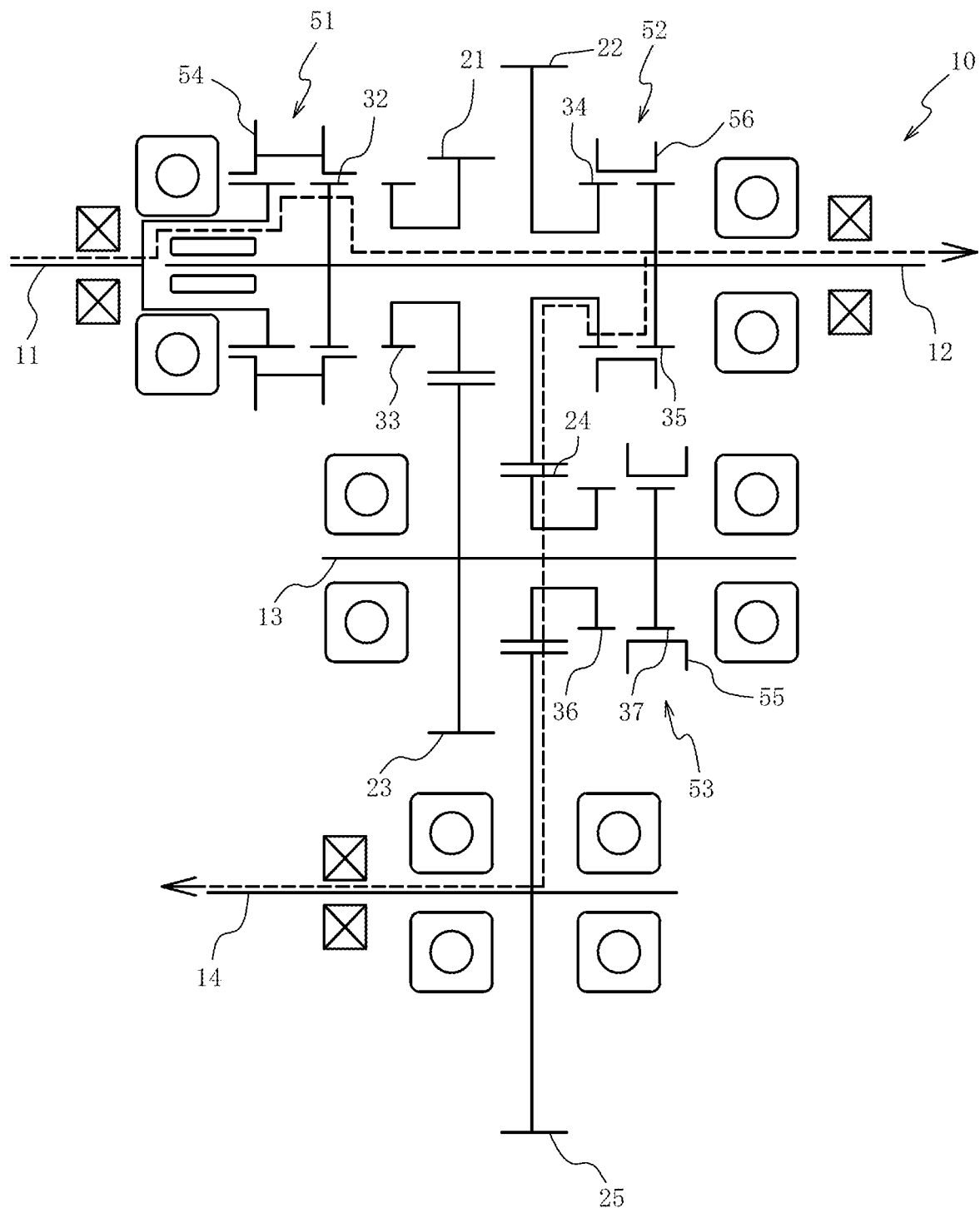
FIG. 6 is a skeleton diagram illustrating the transfer in a four-wheel high-speed position.

FIG. 6 is a skeleton diagram illustrating the transfer 10 in the four-wheel high-speed position (4H). In the four-wheel high-speed position (4H), the first device 51 is switched to HIGH, the second device 52 is switched to ON, and the third device 53 is switched to OFF (see FIG. 3).

In this state, as illustrated in FIG. 6, the sleeve 54 of the first device 51 engages with the hub 31 and the spline 32. The sleeve 55 of the third device 53 engages with only the spline 37, and the sleeve 56 of the second device 52 engages with the splines 34, 35. Accordingly, the torque of the input shaft 11 is transmitted to the first output shaft 12 via the sleeve 54. The torque of the first output shaft 12 is transmitted to the second gear 22 via the sleeve 56. The fourth gear 24 meshing with the second gear 22 rotates, and the fifth gear 25 meshing with the fourth gear 24 rotates. Consequently, the torque is transmitted to the first output shaft 12 and the second output shaft 14.

Figure 7:
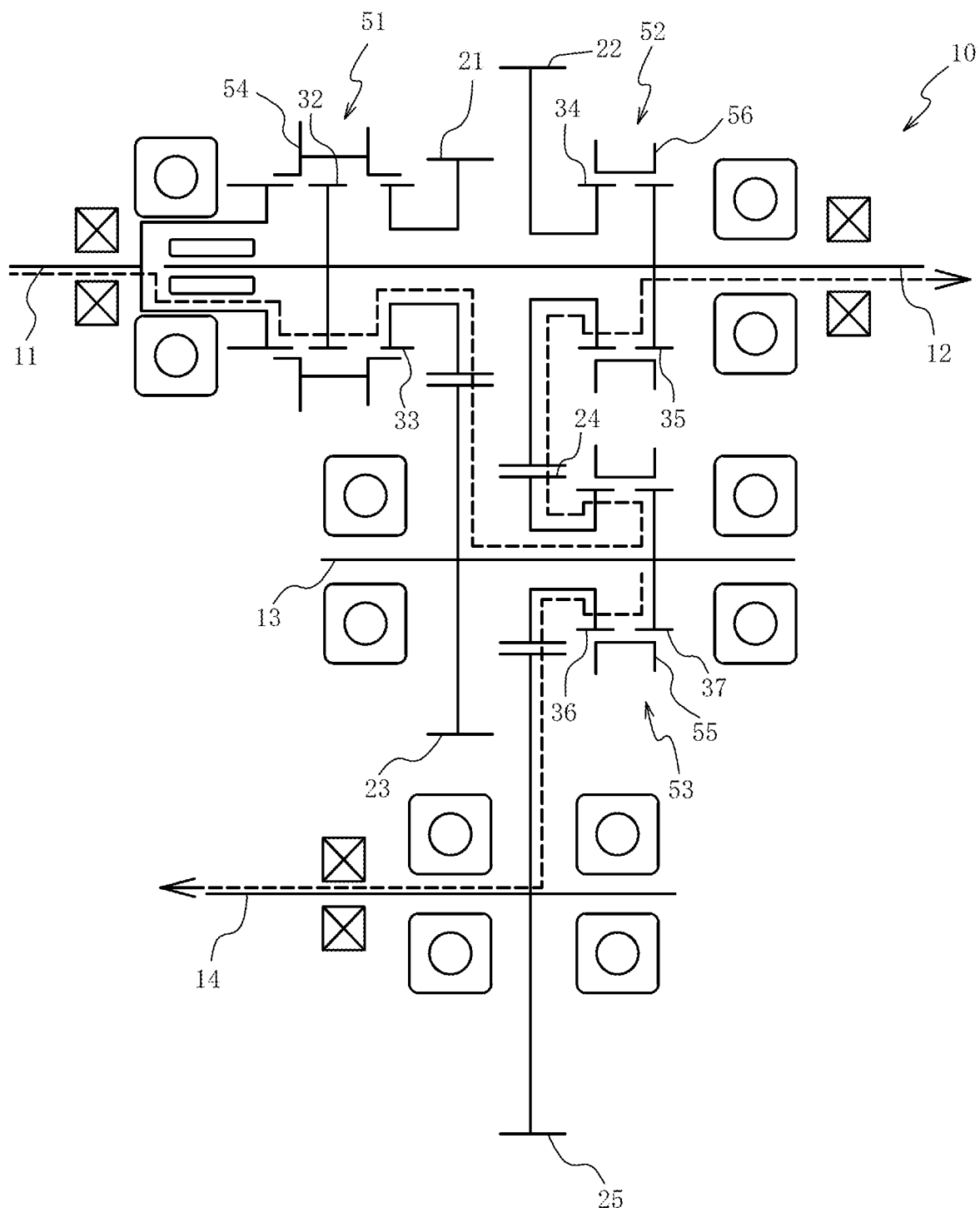
FIG. 7 is a skeleton diagram illustrating the transfer in a four-wheel low-speed position.

FIG. 7 is a skeleton diagram illustrating the transfer 10 in the four-wheel low-speed position (4L). In the four-wheel low-speed position (4L), the first device 51 is switched to LOW, and the second device 52 and the third device 53 are switched to ON (see FIG. 3).

In this state, as illustrated in FIG. 7, the sleeve 54 of the first device 51 engages with the hub 31 and the spline 33. The sleeve 55 of the third device 53 engages with the splines 36, 37, and the sleeve 56 of the second device 52 engages with the splines 34, 35. Accordingly, the torque of the input shaft 11 is transmitted to the first gear 21 via the sleeve 54. The first gear 21 idles on the first output shaft 12. However, the third gear 23 meshing with the first gear 21 rotates so as to rotate the fourth gear 24 via the intermediate shaft 13 and the sleeve 55. The second gear 22 meshing with the fourth gear 24 rotates so as to rotate the first output shaft 12 via the sleeve 56. Further, the fifth gear 25 meshing with the fourth gear 24 rotates. Consequently, the torque is transmitted to the first output shaft 12 and the second output shaft 14.

The first device 51 and the third device 53 coordinate with each other to switch between the four-wheel high-speed position (4H) and the four-wheel low-speed position (4L) (see FIG. 3). When switching is to be made from the four-wheel high-speed position (see FIG. 6) to the four-wheel low-speed position (see FIG. 7), the sleeve 55 of the third device 53 slightly slides to engage with the splines 36, 37. As a result, a double-meshing state occurs. This makes it possible to prevent differential rotation between the first output shaft 12 and the first gear 21. Subsequently, the sleeve 54 of the first device 51 disengages from the spline 32, and successively engages with the hub 31 and the spline 33. In this instance, it is possible to prevent the sleeve 54 from colliding with the spline 33 and generating abnormal noise.

Similarly, when switching is to be made from the four-wheel low-speed position (see FIG. 7) to the four-wheel high-speed position (see FIG. 6), the sleeve 54 of the first device 51, which is in mesh with the hub 31 and the spline 33, slides to engage with the hub 31 and the spline 32. Subsequently, the sleeve 55 of the third device 53 disengages from the spline 36. When the sleeve 54 engages with the spline 32, no differential rotation occurs between the first output shaft 12 and the first gear 21. This makes it possible to prevent the sleeve 54 from colliding with the spline 32 and generating abnormal noise.

Particularly, when the input shaft 11 coordinates with an output shaft (not depicted) of an automatic transmission, the input shaft 11 differentially rotates due to dragging rotation of the output shaft. Therefore, at the time of switching, the sleeve 54 is likely to collide with the splines 32, 33 and generate abnormal noise. However, this problem is solved by the transfer 10 in which the first device 51 and the third device 53 coordinate with each other to perform switching after the occurrence of the double-meshing state.

According to the transfer 10, when, in the four-wheel low-speed position (4L) (see FIG. 7), torque is transmitted from the input shaft 11 to the second output shaft 14 via the first gear 21, the third gear 23, the fourth gear 24, and the fifth gear 25, torque is transmitted from the input shaft 11 to the first output shaft 12 via the first gear 21, the third gear 23, the fourth gear 24, and the second gear 22. The first gear 21, the third gear 23, and the fourth gear 24 are shared without installing additional gears. This makes it possible to reduce the speeds of both the first output shaft 12 and the second output shaft 14 while suppressing an increase in the size of the device, and properly obtain the torque of the first output shaft 12 and the torque of the second output shaft 14. As no additional gears are installed, the weight of the transfer 10 can be reduced.

The switching device 40 including the first device 51, the second device 52, and the third device 53 is configured so that the first device 51 separably couples the first gear 21 to the input shaft 11. The third device 53 separably couples the fourth gear 24 to the intermediate shaft 13. The second device 52 separably couples the second gear 22 to the first output shaft 12. Therefore, the neutral position (see FIG. 5) can be obtained by separating the first gear 21, the second gear 22, and the fourth gear 24 from the shafts.

The first gear 21 and the second gear 22 are disposed axially between the first device 51 and the second device 52 (see FIG. 1). Therefore, as compared to a case where a shift fork or other switching device is disposed between the first gear 21 and the second gear 22, a portion of the first output shaft 12 between the first gear 21 and the second gear 22 can be reduced in length. Further, the intermediate shaft 13 on which the third gear 23 meshing with the first gear 21 and the fourth gear 24 meshing with the second gear 22 are disposed can also be reduced in length. This also makes it possible to reduce the axial length of the case 15 and second output shaft 14, which are disposed so as not to interfere with the third gear 23. Consequently, the overall axial length of the transfer 10 can be reduced. As a result, the transfer 10 can be reduced in weight.

Moreover, the first device 51 and the second device 52 are respectively disposed on both axial sides of the first and second gears 21, 22 (see FIG. 1) by making effective use of the space in the case 15. The case 15 can be divided into two parts, namely, the first case 16 and the second case 17, in order to reduce the axial length of the case 15.

The first device 51 allows the sleeve 54 to slide in the axial direction for the purpose of switching between a state where the input shaft 11 and the first gear 21 are coupled and a state where the input shaft 11 and the first output shaft 12 are coupled. As the number of parts included in the first device 51 can be reduced, it is possible to reduce the weight of the switching device 40 and simplify the configuration of the switching device 40.

The sleeves 54, 55, 56 of the first, second, and third devices 51, 52, 53 are sequentially driven in the axial direction due to the rotary motion of the cams 48, 49 having the same central axis 50. Therefore, the switching device 40 can be simplified.

In a state where the sleeve 55 of the third device 53 engages with the splines 36, 37 so as to couple the fourth gear 24 to the intermediate shaft 13, the cams 48, 49 (cylindrical cams) cause the sleeve 54 of the first device 51 to be driven to engage with the splines 32, 33. Differential rotation between the first output shaft 12 and the first gear 21 can be prevented before the first device 51 operates. This makes it possible to suppress abnormal noise from being generated when the sleeve 54 of the first device 51 is driven to mesh with the splines 32, 33.

Figure 8:
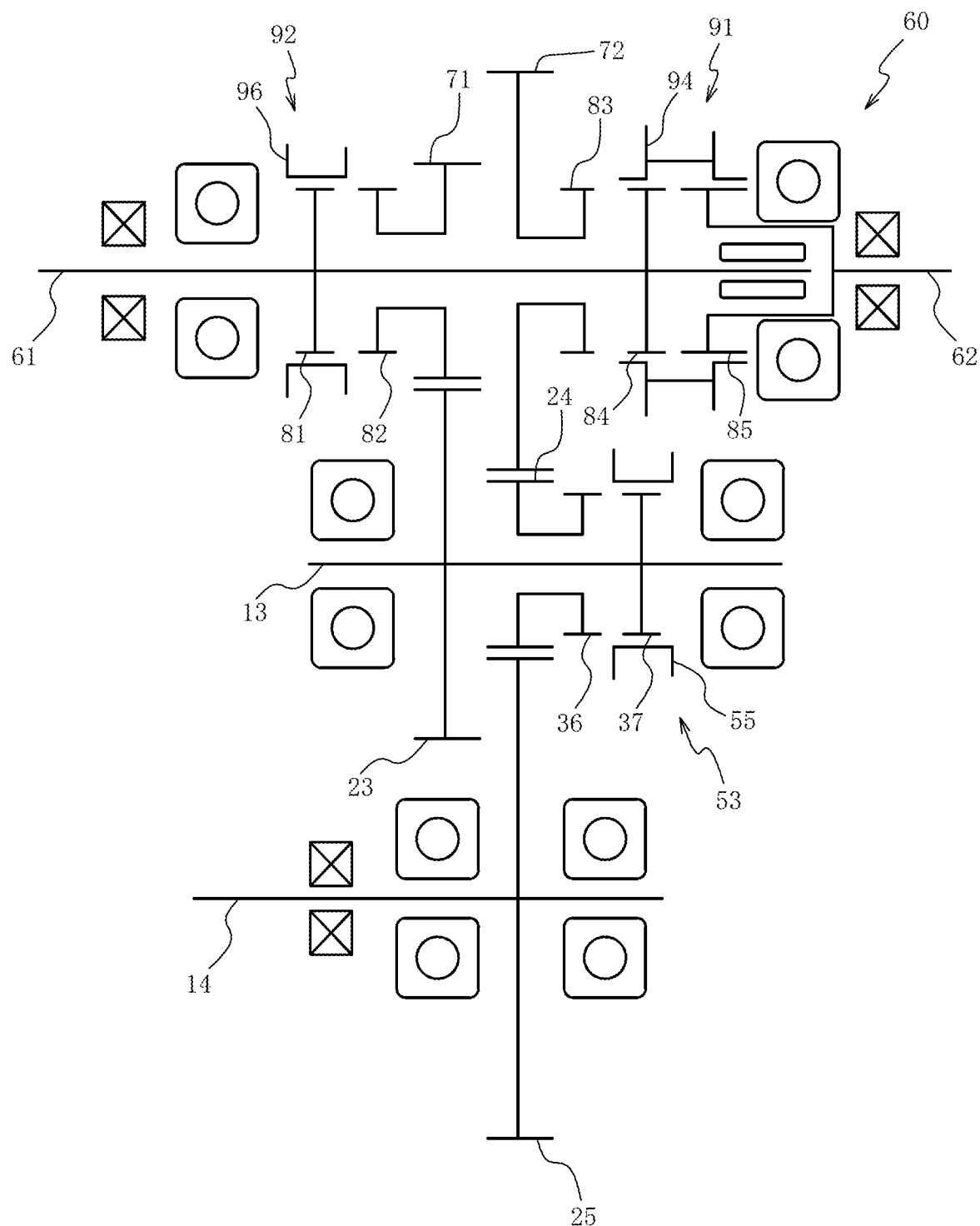
FIG. 8 is a skeleton diagram illustrating the transfer according to a second embodiment.

A second embodiment will now be described with reference to FIG. 8. The first embodiment has been described on the assumption that the first gear 21 and the second gear 22 are disposed on the first output shaft 12. Meanwhile, the second embodiment will be described on the assumption that a first gear 71 and a second gear 72 are disposed on the input shaft 11. Elements identical with those described in conjunction with the first embodiment are designated by the same reference signs as their counterparts and will not be redundantly described. FIG. 8 is a skeleton diagram illustrating a transfer 60 according to the second embodiment.

As illustrated in FIG. 8, the transfer 60 includes an input shaft 61 and a first output shaft 62. The input shaft 61 and the first output shaft 62 are disposed on the same axis. The input shaft 61 is linked to a driving source (not depicted). An end of the input shaft 61 is relatively rotatably supported by the inside of an end of the first output shaft 62. The first output shaft 62 is linked, for example, to a rear wheel.

The first gear 71 and the second gear 72 are relatively rotatably disposed on the input shaft 61. The first gear 71 is in constant mesh with the third gear 23, and the second gear 72 is in constant mesh with the fourth gear 24. A spline 81 is coupled to the input shaft 61. A spline 82 is lined up in the axial direction of the spline 81. The spline 82 is coupled to the first gear 71.

A hub 85 is coupled to the first output shaft 62. Splines 83, 84 are arranged in the axial direction of the hub 85. The spline 83 is coupled to the second gear 72, and the spline 84 is coupled to the input shaft 61.

A sleeve 94 of a second device 91 is disposed on the outer peripheries of the splines 83, 84 and hub 85. The sleeve 94 slides in the axial direction while meshing with the splines 83, 84 and the hub 85. A sleeve 96 of a first device 92 is disposed on the outer peripheries of the splines 81, 82. The sleeve 96 slides in the axial direction while meshing with the splines 81, 82.

The sleeves 94, 55, 96 of the second device 91, first device 92, and third device 53 are moved in the axial direction by a cylindrical cam formed on the drum 47 (see FIG. 2) and a shift fork (not depicted) driven by the cylindrical cam. The positions of the second first device 91, first device 92, and third device 53 are switched along the cam curve of the drum 47. Accordingly, as is the case with the first embodiment, the transfer 60 selects the two-wheel drive position (2H), the neutral position (N), the four-wheel high-speed position (4H), or the four-wheel low-speed position (4L).

Figure 9:
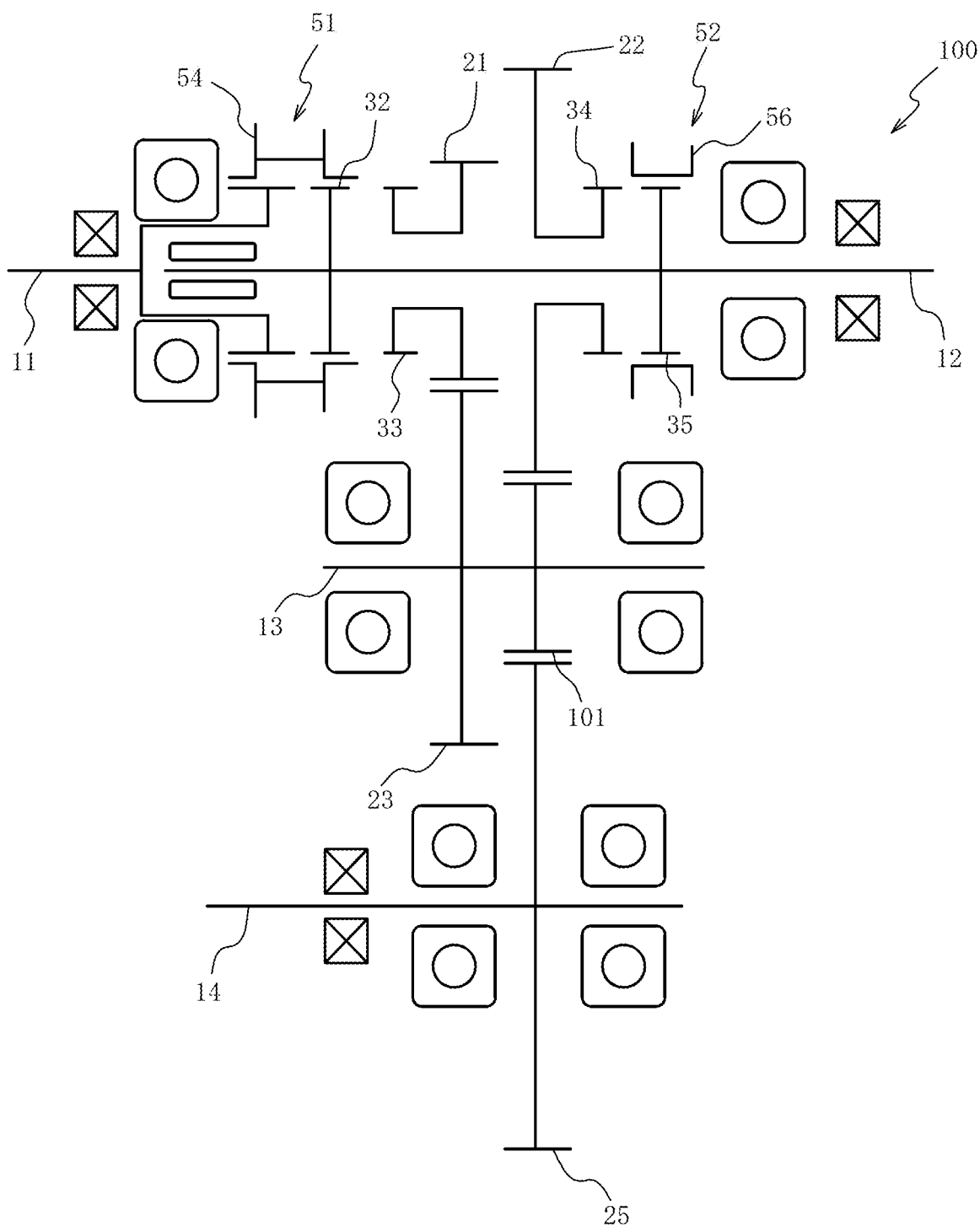
FIG. 9 is a skeleton diagram illustrating the transfer according to a third embodiment.

A third embodiment and a fourth embodiment will now be described with reference to FIGS. 9 and 10. The first and second embodiments have been described on the assumption that the third device 53 is included in order to separably couple the fourth gear 24 to the intermediate shaft 13. Meanwhile, the third and fourth embodiments will be described on the assumption that the third device 53 is excluded. Elements identical with those described in conjunction with the first or second embodiment are designated by the same reference signs as their counterparts and will not be redundantly described. FIG. 9 is a skeleton diagram illustrating a transfer 100 according to the third embodiment.

As illustrated in FIG. 9, the transfer 100 is configured so that a fourth gear 101 in constant mesh with the second gear 22 is coupled to the intermediate shaft 13. The sleeves 54, 56 of the first device 51 and second device 52 are moved in the axial direction by a cylindrical cam formed on the drum 47 (see FIG. 2) and a shift fork (not depicted) driven by the cylindrical cam. The positions of the first device 51 and second device 52 are switched along the cam curve of the drum 47. Accordingly, the transfer 100 selects the two-wheel drive position (2H), the four-wheel high-speed position (4H), or the four-wheel low-speed position (4L).

Figure 10:
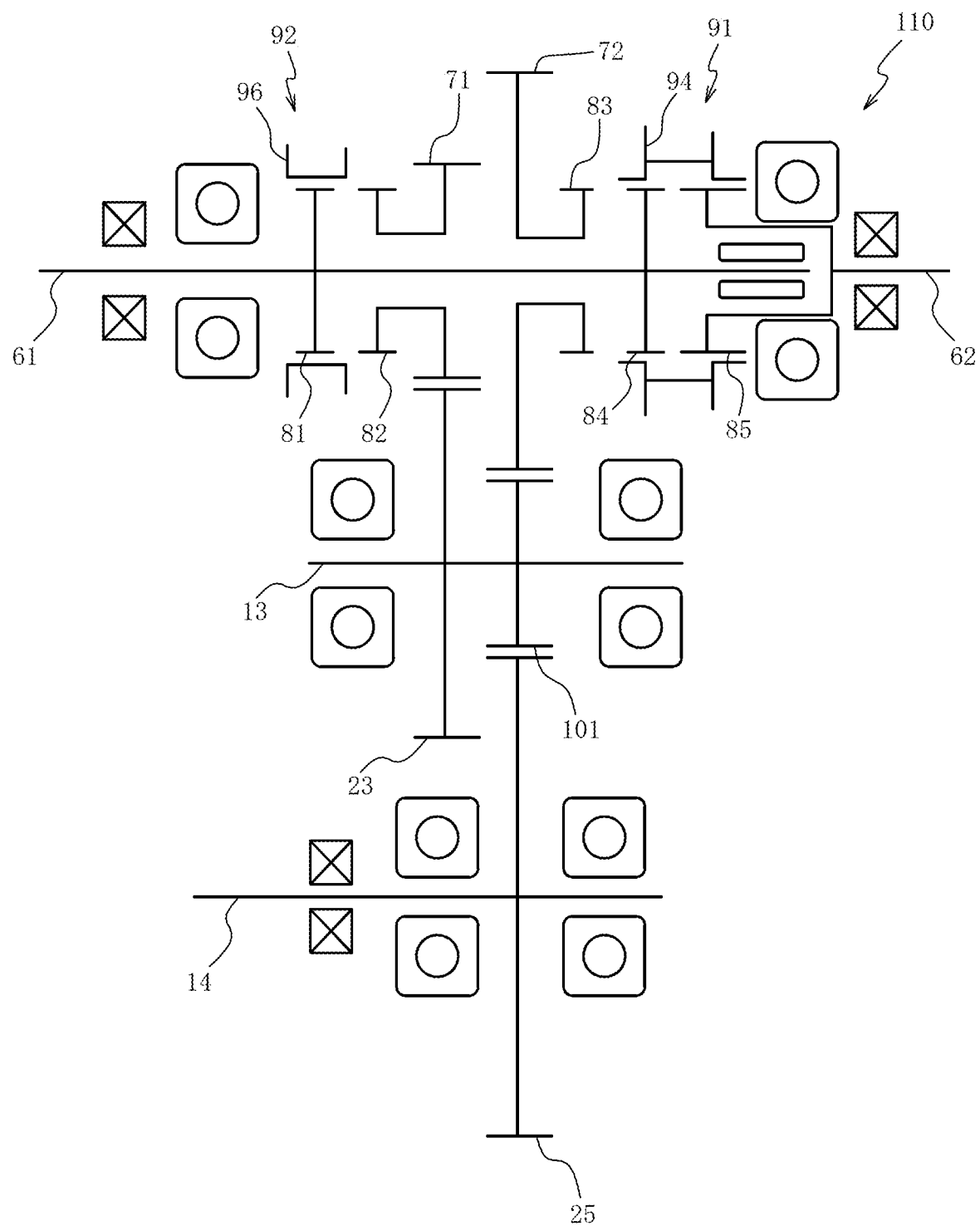
FIG. 10 is a skeleton diagram illustrating the transfer according to a fourth embodiment.

FIG. 10 is a skeleton diagram illustrating a transfer 110 according to the fourth embodiment. As illustrated in FIG. 10, the transfer 110 is configured so that the fourth gear 101 in constant mesh with the second gear 72 is coupled to the intermediate shaft 13. The sleeves 94, 96 of the second device 91 and first device 92 are moved in the axial direction by a cylindrical cam formed on the drum 47 (see FIG. 2) and a shift fork (not depicted) driven by the cylindrical cam. The positions of the second device 91 and first device 92 are switched along the cam curve of the drum 47. Accordingly, the transfer 110 selects the two-wheel drive position (2H), the four-wheel high-speed position (4H), or the four-wheel low-speed position (4L).

While the present invention has been described in conjunction with embodiments, persons skilled in the art will readily appreciate that the present invention is not limited to the foregoing embodiments, and that various improvements and modifications may be made without departing from the spirit of the present invention.

The description of the foregoing embodiments has dealt with a case where, in the four-wheel low-speed position (4L), torque is transmitted from the input shaft 11 to the second output shaft 14 via the first gear 21, the third gear 23, the fourth gears 24, 101, and the fifth gear 25, torque is transmitted from the input shaft 11 to the first output shaft 12 via the first gear 21, the third gear 23, the fourth gears 24, 101, and the second gear 22. However, the present embodiment is not limited to such a case. For example, if the sleeve 54 of the first device 51 can be enabled to engage with the hub 31 and the splines 32, 33, the torque of the input shaft 11 can be transmitted to the first output shaft 12 without going through the gears when the second device 52 is turned off to transmit torque from the input shaft 11 to the second output shaft 14 via the first gear 21, the third gear 23, the fourth gears 24, 101, and the fifth gear 25. Similarly, it is obvious that the sleeve 94 of the second device 91 can be enabled to engage with the splines 83, 84 and the hub 85. Also, in these cases, it is possible to reduce the axial length of the transfers 10, 60, 100, 110.

The invention claimed is:

1. A transfer comprising:
   an input shaft that receives inputted torque;
   a first output shaft that is disposed on the axis of the input shaft and rotatable relative to the input shaft;
   an intermediate shaft that is disposed on an axis different from the axis of the input shaft;
   a second output shaft that is disposed on an axis different from the axes of the intermediate shaft and input shaft;
   a first gear and a second gear that are disposed on either one of the input shaft and the first output shaft;
   a third gear and a fourth gear that are disposed on the intermediate shaft and in mesh with the first gear and the second gear;
   a fifth gear that is disposed on the second output shaft and in mesh with the fourth gear; and
   a switching device;
   wherein the switching device includes
   a first device that separably couples the first gear to the input shaft, and
   a second device that separably couples the second gear to the input shaft or the first output shaft; and
   wherein the first gear and the second gear are disposed axially between the first device and the second device.

2. The transfer according to claim 1, wherein the switching device switches between a state where the input shaft and the first gear are coupled or the first output shaft and the second gear are coupled and a state where the input shaft and the first output shaft are coupled.

3. The transfer according to claim 1, wherein the switching device sets a state for transmitting torque from the input shaft to the first output shaft via the first gear, the third gear, the fourth gear, and the second gear, and transmitting torque from the input shaft to the second output shaft via the first gear, the third gear, the fourth gear, and the fifth gear.

4. The transfer according to claim 1, wherein the switching device sets a state for transmitting torque from the input shaft to the first output shaft, and transmitting torque from the input shaft to the second output shaft via the second gear and the fourth gear.

5. The transfer according to claim 1, wherein the switching device has a position where torque of the input shaft is not transmitted to the first gear and the first output shaft.

6. The transfer according to claim 1, wherein the first device and the second device are driven in the axial direction due to the rotary motion of cams having the same central axis.

7. The transfer according to claim 1, wherein the switching device includes a third device that separably couples the fourth gear to the intermediate shaft.

8. The transfer according to claim 7, wherein the first device, the second device, and the third device are driven in the axial direction due to the rotary motion of cams having the same central axis.

9. The transfer according to claim 8, wherein, when a transition is made from a state where torque is transmitted from the input shaft to the first output shaft and transmitted from the second gear to the second output shaft via the fourth gear and the fifth gear to a state where torque is transmitted from the input shaft to the first output shaft via the first gear, the third gear, the fourth gear, and the second gear and transmitted to the second output shaft via the fourth gear and the fifth gear, the cams cause the third device to engage the fourth gear with the intermediate shaft, and then switch the first device or the second device.

10. The transfer according to claim 9, wherein, when a transition is made from a state where torque is transmitted from the input shaft to the first output shaft via the first gear, the third gear, the fourth gear, and the second gear and transmitted to the second output shaft via the fourth gear and the fifth gear to a state where torque is transmitted from the input shaft to the first output shaft and transmitted from the second gear to the second output shaft via the fourth gear and the fifth gear, the cams cause the first device or the second device to engage the input shaft with the first output shaft, and then switch the third device.

11. The transfer according to claim 1, wherein the switching device includes a first hub is coupled to the input shaft, a first spline is coupled to the first output shaft, a second spline is coupled to the first gear, and a first sleeve to engage any two of the first hub, the first spline and the second spline.

12. The transfer according to claim 1, wherein the switching device includes a second hub is coupled to the first output shaft, a third spline is coupled to the input shaft, a fourth spline is coupled to the second gear, and a second sleeve to engage any two of the second hub, the third spline and the fourth spline.

13. The transfer according to claim 2, when the switching device combines the input shaft and the first output shaft, it separates the input shaft and the first gear.

14. The transfer according to claim 2, when the switching device combines the input shaft and the first output shaft, it separates the first output shaft and the second gear.

\* \* \* \* \*